G. R. WARD.
WRAPPING MACHINE.
APPLICATION FILED APR. 4, 1908.

1,087,413.

Patented Feb. 17, 1914.
9 SHEETS—SHEET 2.

Witnesses:
E. A. Jarvis
Beatrice Morris

Inventor
George R. Ward
by Emerson R. Newell
his Attorney

G. R. WARD.
WRAPPING MACHINE.
APPLICATION FILED APR. 4, 1908.

1,087,413.

Patented Feb. 17, 1914.
9 SHEETS—SHEET 7.

Inventor:
George R. Ward

UNITED STATES PATENT OFFICE.

GEORGE R. WARD, OF NEW YORK, N. Y.

WRAPPING-MACHINE.

1,087,413.  Specification of Letters Patent.  Patented Feb. 17, 1914.

Application filed April 4, 1908. Serial No. 425,245.

*To all whom it may concern:*

Be it known that I, GEORGE R. WARD, a citizen of the United States, residing at New York, N. Y., have invented certain new and useful Improvements in Wrapping-Machines, of which the following is a clear, full, and exact description.

My invention relates to a wrapping machine for articles, such as cakes of soap, chocolate, and the like, and is designed more particularly for those forms of cakes having rounded, beveled or irregular sides.

In the present embodiment I have provided a bottomless folding die and means for forcing a wrapper and article therethrough. My preferred form of die has slots extending outwardly from each corner thereof. The walls of said slots gradually curl inwardly toward the bottom of the die, and when a wrapper and article are being forced through, upstanding corner folds of the wrapper are formed by said slots and are gradually folded around the end of said die by the contour of said walls. Means are provided at the exit end of the die for folding the upstanding portions of the wrapper down upon the top of the article to entirely cover the same and present a neat-looking package not easily loosened.

My invention will be defined in the claims.

In the preferred embodiment of my invention shown in the drawings.

Figure 1:
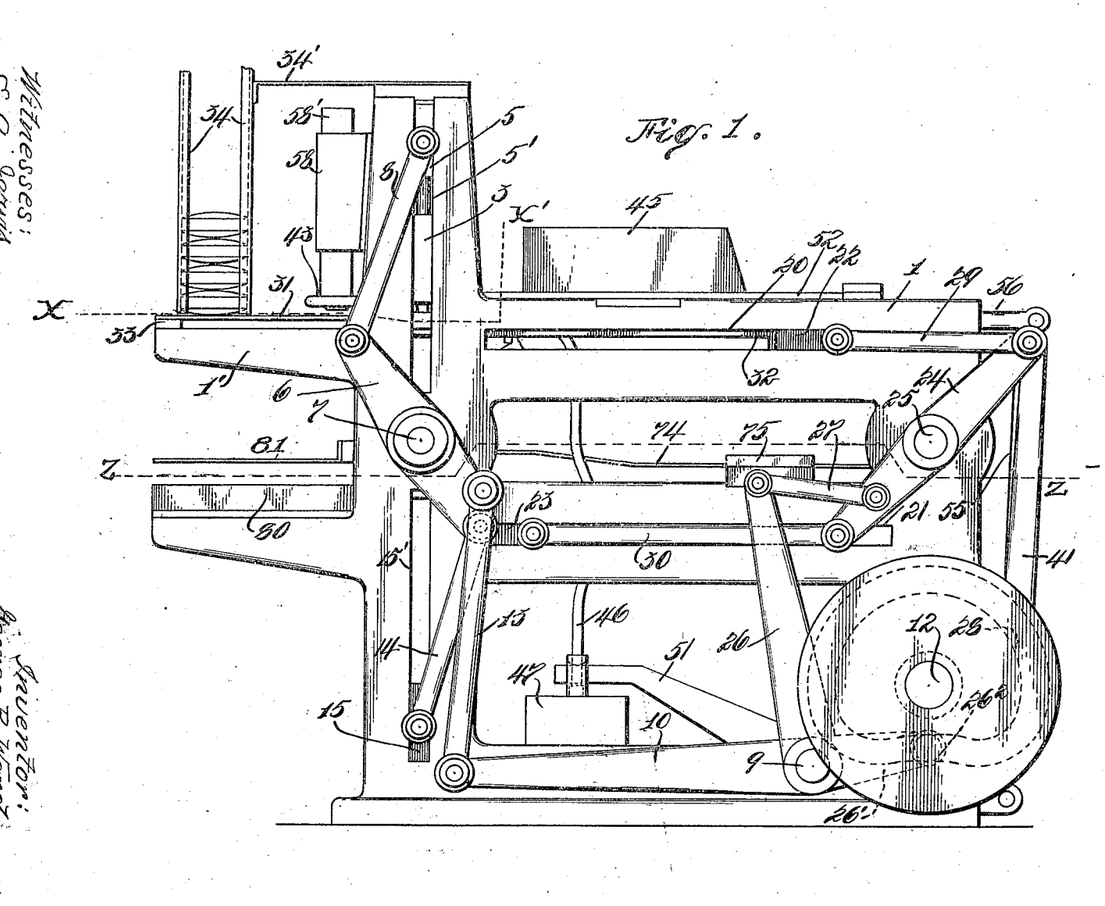
Figure 1 is a side elevation of the entire machine.
Figure 2:
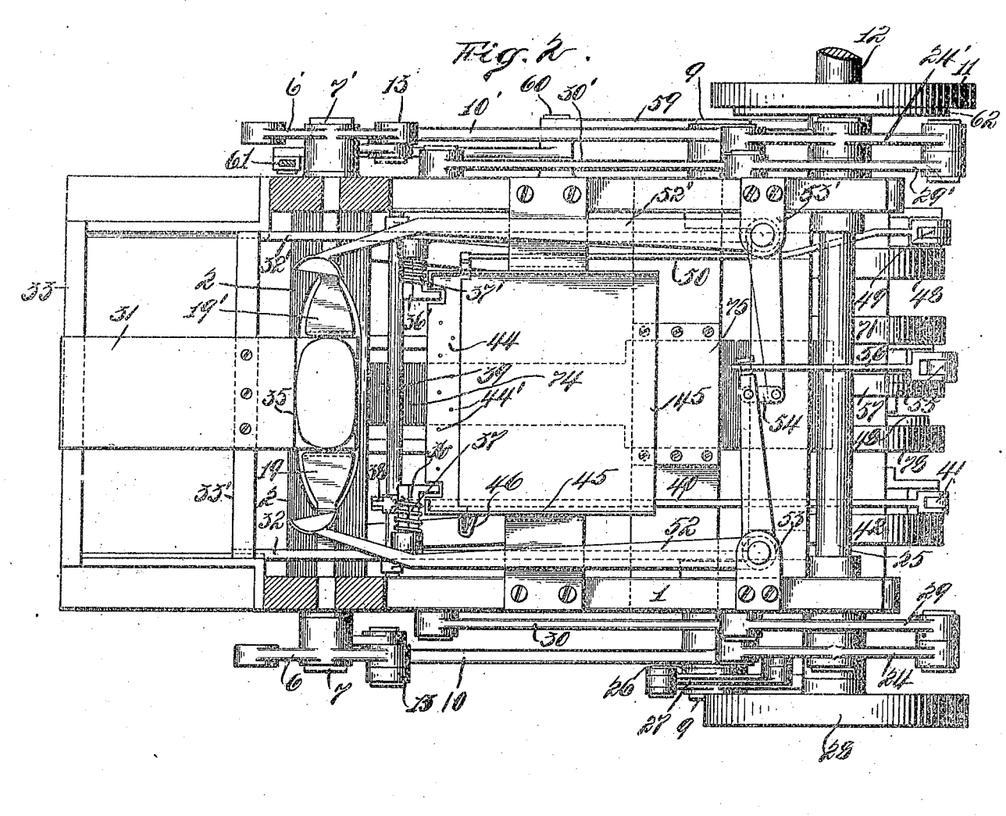
Fig. 2 is a plan view of the same with a section taken through the upper end portion of said frame, line X—X Fig. 1.
Figure 3:
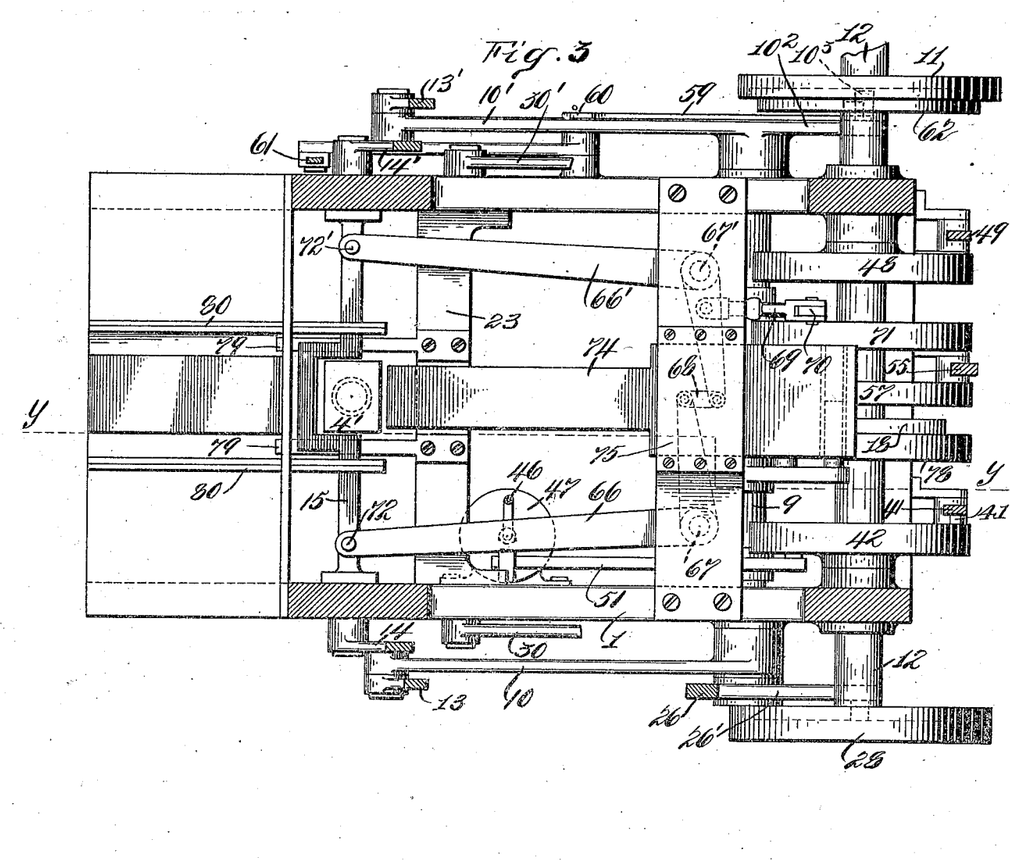
Fig. 3 is a section taken through line Z—Z Fig. 1.
Figure 4:
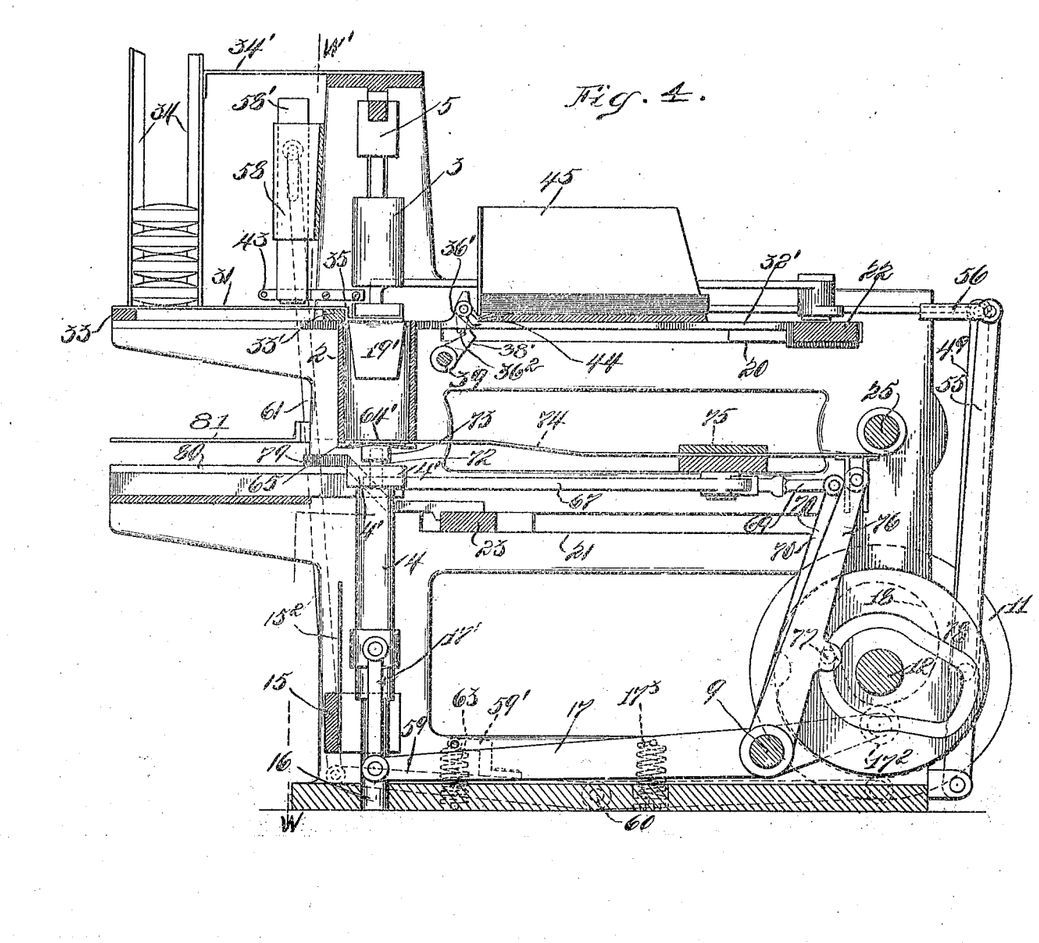
Fig. 4 is a section taken through line Y—Y Fig. 3.
Figure 5:
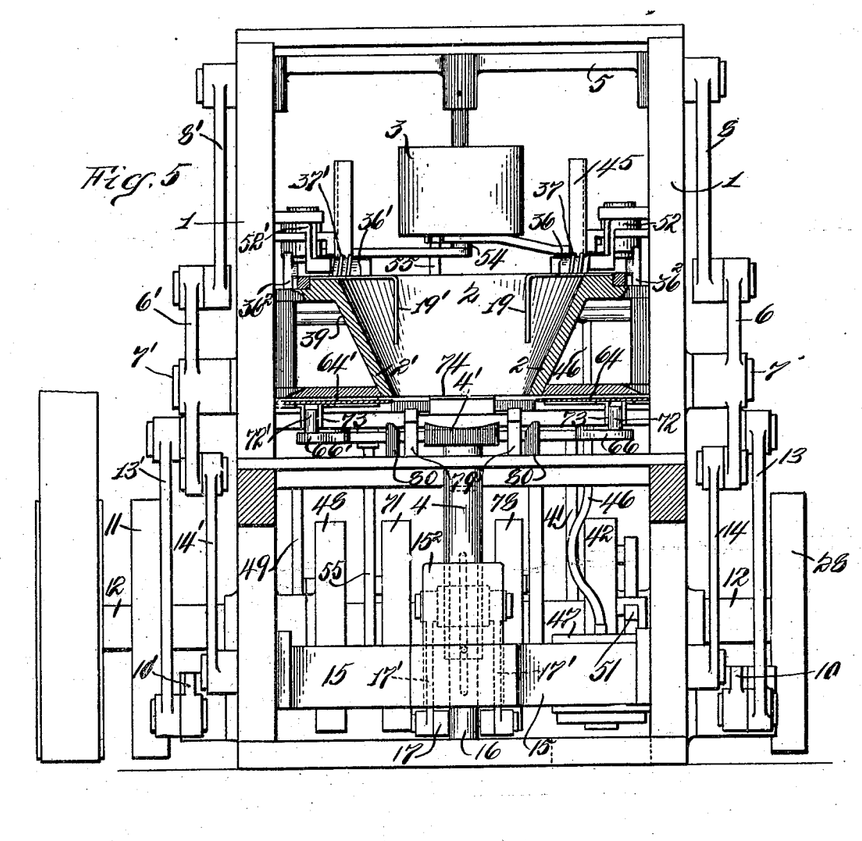
Fig. 5 is a front view of the machine with a section taken through the die, line W—W Fig. 4.

1 is the main frame of the machine, and at the forward portion thereof I preferably mount a folding die shown in Figs. 2, 4 and 5, fixedly to said main frame. I prefer also to employ a bottomless die, and for the purpose of forcing an article and wrapper through the same I have provided plungers 3, 4, above and below said die to coöperate with each other in carrying the article therethrough. The upper or forcing plunger 3 is shown as carried by a vertically reciprocating cross head 5 mounted to slide in guideways 5', formed at each side of the main frame at the forward end thereof. The means for operating this cross head and plunger consist of rocking levers 6, 6', mounted on bearing studs 7, 7' at each side of the main frame. Links 8, 8' connect these rocking levers 6, 6' with opposite ends of the cross head 5. Mounted in bearings at the lower part of the main frame is a rocking shaft 9 (see Figs. 1 and 4). This shaft extends across the entire width of the machine, and securely attached to each end thereof are operating levers 10, 10'. The operating lever 10' at the left-hand side has a short arm 10², provided with a roller stud 10³ which extends into a slot of a controlling cam 11 (see Figs. 2 and 3). Said cam 11 is firmly secured to an operating shaft 12, mounted at the lower rear end of the machine. This shaft 12 is rotated by any suitable source of power, and through its several connections operates all of the movable parts of the machine. The free end of levers 10, 10' are connected by links 13, 13' to each of the rocking levers 6, 6', respectively. Also connected to the same ends of said rocking levers 6, 6' by links 14, 14' is a lower cross head 15, mounted to slide in guideways 15' formed in each side of said main frame. This lower cross head carries a guard plate 15², the purpose of which will appear hereafter.

Referring more particularly to Figs. 4 and 5, the lower plunger 4, which supports the article as it is forced through the die, is formed into a hollow sleeve portion at its lower end, and is mounted to slide upon a stationary post 16 fixedly attached to the bottom of the main frame. At the upper portion of said plunger 4, is formed a supporting head 4' which is adapted to conform to the shape of the article to be wrapped. In the embodiment shown, it has a concave portion to receive the rounded side of a cake of soap (see Fig. 5). The plunger 4 is operated by a lever 17 loosely mounted on rocking shaft 9 to have a movement independent thereof. This lever 17 is connected at one end by a link 17' to said plunger 4, and at the other end is provided with a roller stud 17² bearing on the outer surface of a cam 18 mounted securely on the operating shaft 12, shown clearly by dotted lines in Fig. 4. A coil spring 17³, fixed at one end to the main frame and at the other to lever 17, acts to maintain the roller 17² of said lever in contact with the surface of the cam 18.

I will now describe the mechanism for feeding a wrapper and article to the mouth of the die. I preferably locate a supply of articles to be wrapped at one side of the die and a supply of wrappers at the opposite side thereof, and provide a reciprocating feeding carrier which, in one direction of its movement, feeds an article, and in the other direction feeds a wrapper to said die. This construction provides a quick feed, but other feeding mechanism may be equally well employed without departing from the spirit of my invention.

Mounted to slide in horizontal guideways 20, 21, formed in the main frame, are upper and lower reciprocating cross heads 22, 23, respectively. Said cross heads are operated similarly to the vertical cross heads above described, and for this purpose I have provided a pair of rocking levers 24, 24', one at each side of the machine, keyed or suitably attached to a rocking shaft 25 mounted in bearings at the rear end of the machine. An angle lever 26 loosely mounted on the shaft 9 has one arm connected to the rocking lever 24 by a link 27. The other arm 26' of said angle lever is provided with a roller stud 26² which extends into the slot of the cam 28 on the main operating shaft, all shown in dotted lines in Fig. 1. The upper ends of the rocking levers 24, 24' are connected by links 29, 29' to opposite ends of the upper cross head 22, and the lower ends of said levers 24, 24' are connected by links 30, 30' to the lower cross head to reciprocate the same.

Carried by said upper cross head 22 is a feeding carrier or table 31, shown more particularly in Figs. 1, 2 and 4. Said table is formed of side frames 32, 32' extending rearwardly and cross beams 33, 33' at the forward portion thereof. The rearwardly extending side frames 32, 32' are firmly attached to the cross head 22, and the cross beams 33, 33' slide on brackets 1' extending from the front of the main frame to support the forward end of said table.

Supported in any suitable manner above said table 31 is a bottomless magazine 34 containing articles to be wrapped. In the construction shown in Figs. 1 and 4, I connect the upper end of said magazine to the upper portion of said main frame by a bracket 34'. At about the center of said carrying table 31 is formed a stepped portion 35 (see Fig. 4), and the depth of this step is preferably equal to the thickness of one article. It will thus be seen that as the table 31 reciprocates across the open bottom of said magazine 34, it will normally support the article therein, but when said stepped portion arrives beneath said magazine, an article will be allowed to drop from the magazine onto the lower portion of the step and will be carried toward the mouth of the die by the further movement of said carrier.

Figure 7:
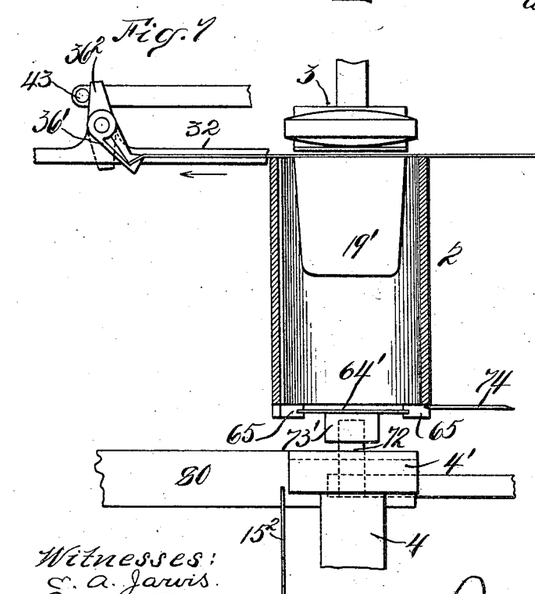
Fig. 7 is a detail view of the die with the supporting jaws and paper grippers showing their coöperation in feeding a wrapper beneath an article.

Mounted upon each side frame 32, 32' of said carrier is a pair of paper grippers 36, 36', for seizing a sheet of wrapping paper and carrying the same over the mouth of the die during the forward movement of said carrier. Any usual means may be employed for operating said paper grippers, but my preferred construction is as follows. One of the jaws of said grippers is immovably mounted on said reciprocating carrier. The other jaw, preferably the lower one, is pivotally mounted to coöperate therewith. Suitable means, such as coil springs 37, 37', are provided to act on the lower jaws to normally keep them closed against the stationary jaws. A double-ended lug portion 36² is formed on the outer end of the pivot of the movable jaw (see more particularly Figs. 4 and 7) and when the carrier and paper grippers are at the very inmost position shown in Fig. 4, a movable arm 38' acts against the lower end of said lug 36² to open the lower jaw of said gripper. Only one arm 38' is here shown, but it will be understood that two of said arms are provided, 38, 38', one at each side of the frame for each of the paper grippers. Said arms 38, 38' are respectively secured at opposite ends of a transverse rocking rod 39 mounted in bearings in the main frame (see Fig. 2). Arm 38 shown in Fig. 2 has a lower extension connected to one end of a link 40, the other end of said link being connected to an operating lever 41 (see Figs. 1 and 3). This operating lever is pivotally mounted at the lower portion of the main frame, and is provided with a roller stud 41' engaging in the slot of a cam 42 carried by the main operating shaft.

It will thus be seen that I have provided movable means for opening the paper grippers to seize the wrapper, and this is my preferred construction, although stationary abutments may be employed in some cases.

For opening the grippers to release the wrapper at the outer end of their travel, I have provided a stationary abutment 43 (see Fig. 4). Said abutment 43 is located in the path of the upper end of lug 36 and causes the same to open the lower jaw of the grippers to release the wrapper when said grippers are moved past the same.

In order to present a single wrapper sheet to said grippers preparatory to being seized, I have mounted a pivoted suction plate 44 at the forward end of the wrapper receptacle 45. This suction plate 44 is hollow and is pivoted to the bottom of said receptacle, as shown in Figs. 2 and 4. A number of holes or air vents 44' are formed in its upper side, and the interior of said plate is connected in any suitable way, such as by hose 46 to an exhaust pump 47 (see Figs. 1, 3 and 4). Means are provided for tilting said plate downwardly at proper times, and in the present instance I have provided a cam 48 on the main shaft, a lever 49 operated therethrough by the usual slot and stud roller engagement, and a connecting link 50 from said lever 49 to an arm on the suction plate pivot (see Fig. 2). A lever 51 loosely mounted on the shaft 9 for operating the pump 47 is provided with a stud roller engaging in a slot of a cam 42 (see Figs. 1 and 3).

It will be understood that the suction plate 44 is normally in contact with the lowermost sheet of the wrappers, and that when the open gripper jaws are presented to the forward end of the receptacle, the suction plate is tilted downwardly, while at the same time the pump 47 is operated to cause a suction therein. The suction through the vent holes 44' causes the lowermost sheet to be lowered with the tilting of the suction plate, without disturbing the other wrappers. In this way a single sheet is separated from the pile of wrappers and presented to the paper grippers.

In the operation of the machine an article is first fed to the mouth of the die by one movement of the carrier and is then supported above said die during the return movement of the carrier for a new article, which return movement also feeds a wrapper beneath the first mentioned article. The supporting means, which I preferably employ, consists of a pair of jaws 52, 52', pivotally mounted on brackets 53, 53', fixed at the rear end of the main frame (see Fig. 2). As I desire to have said jaws operate simultaneously in grasping the article, I preferably form them into angle levers and connect the short ends of said levers by a link 54, and to one of said angle levers, such as 52, an operating lever 55 is connected by link 56. A cam 57 is mounted on the main shaft for operating the lever 55 by the usual slot and stud roller engagement.

Any suitable paste supply, such as 58, may be mounted above the carrier to apply paste to the wrapper previous to its insertion in the die. I have provided, in the present embodiment, a reciprocating paste plunger 58' for contacting with said wrapper, and operate the same by a rocking lever 59 mounted on stud 60 at the bottom of the machine (see Figs. 3 and 4). Said lever is connected at one end by link 61 to the paste plunger 58', and at the other end carries a roller stud bearing on the outer surface of the cam 62. A spring 63 attached at one end of the main frame, and at the other to a bracket 59' mounted on said lever, acts to maintain the roller stud of said lever in contact with the outer surface of cam 62.

Referring more particularly to Figs. 2, 4, 5, 10, 11 and 12, my preferred form of die may be seen.

Figure 18:
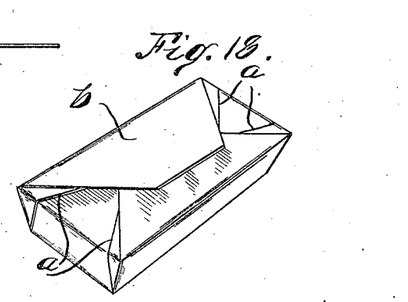

In the present embodiment the die is constructed of a main box portion 2 firmly attached to the main frame, as before stated. In folding a wrapper about an article I prefer to have the corner flaps indicated by $a$ in Figs. 16, 17 and 18, extend first outwardly and then gradually lapped about the article and finally folded down upon the top of the same. I prefer this method of wrapping for the reason that the folds of the wrapper can be controlled and guided more positively and with less liability of strain on the paper. Also after the ends and corners of the upstanding wrapper are folded down upon the article, the side flaps can be successively folded down, whereby the loose side flap indicated by $b$ in Figs. 16, 17 and 18 covers and binds firmly to the package the ends of all the other flaps. However, although I prefer to form this type of package, it is obvious that the method of folding might be varied at will by slight changes in the operation of the folding mechanism in conjunction with my bottomless folding die.

Figures 6, 16, 17:
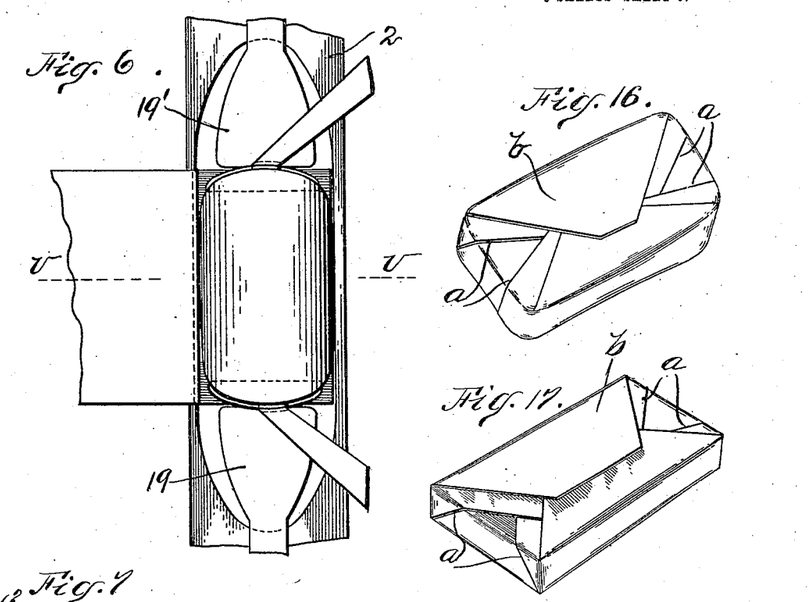
Fig. 6 is a plan view of the die and portions of the supporting jaws engaging the article.
Figs. 16, 17 and 18 are views of different shaped articles wrapped by my machine.
Figures 8, 9, 10, 11, 12:
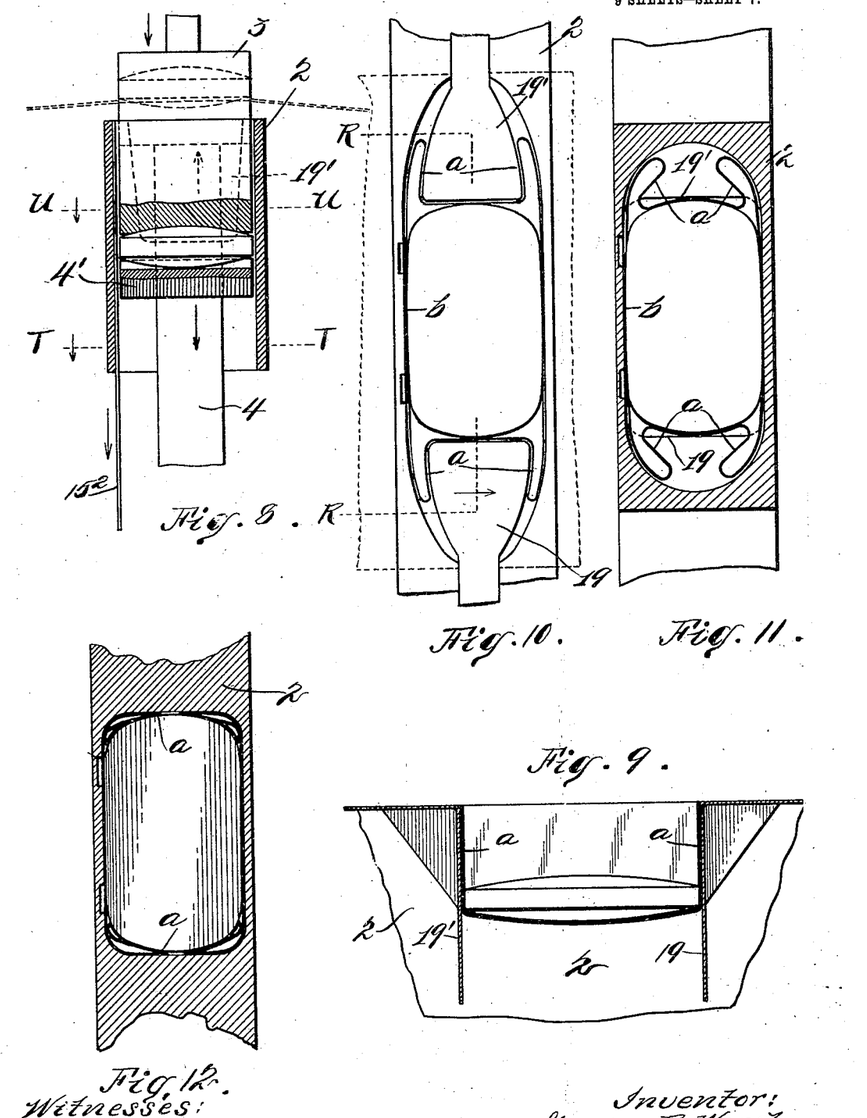
Fig. 8 is another detail view showing a subsequent operation, that of forcing the article and wrapper through the die, the die and portions of the plunger being shown in section.
Fig. 9 is a similar view looking at the broad side of the die, line R—R Fig. 10.
Fig. 10 is a plan view of the same showing the wrapper folds entering the slots of the die.
Figs. 11 and 12 are horizontal sections taken through U—U and T—T, respectively, of Fig. 8 and showing the changes in contour of the slot walls.

In order to fold the corner flaps of the wrapper outwardly, I have formed outwardly extending slots at the receiving end or mouth of the die (see Figs. 2, 6 and 10). Guiding abutments 19, 19' are attached at opposite ends of the mouth of said die and are spaced at a slight distance from the side walls of the body portion of said die to form outwardly extending slots. The guiding abutments preferably extend vertically downward some distance from the mouth of the die to form a closely fitting passageway for the article and wrapper. The end walls 2' of the main body of the die taper inwardly toward the exit end, as seen by the drawings, and the lower ends of the same form the end walls of the article passageway. The space between the upper portion of said main body wall and the guiding abutments forms a passageway for the corner flaps of the wrapper. These tapering walls gradually turn the flaps inwardly around the article as the same is forced through the die, and as the corner flaps pass beneath the lower end of the guiding abutments and out the exit end of said die, said corner flaps are closely packed about the ends of the article, as will be easily understood.

The means for folding the upstanding portions of the wrapper down upon the top of the article after the same has been forced through said die will now be described. Referring more particularly to Figs. 3, 4 and 5 and the detail views Figs. 13, 14 and 15, it will be understood that the article is supported upon the plunger 4 at the exit end of the die with the upstanding portions of the wrapper extending therein during the subsequent operations of the folding blades.

Figure 13:
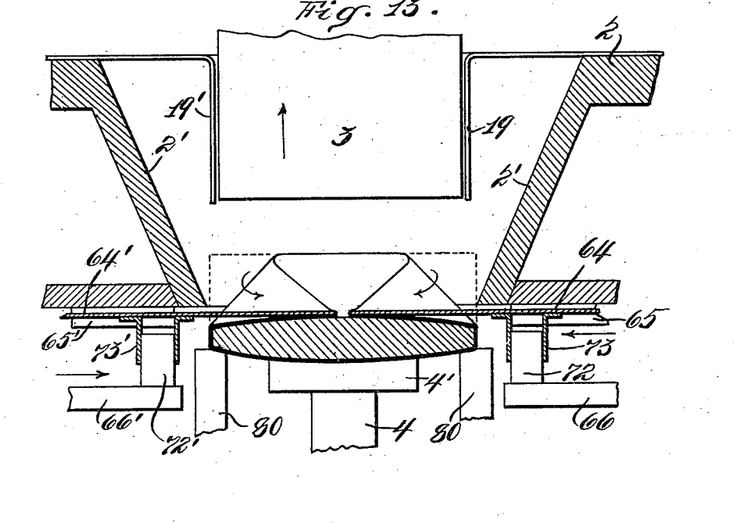
Fig. 13 is a vertical section lengthwise of the die and showing details of the end folding mechanism.

I prefer to first fold down the end portions of the wrapper and for this purpose provide a pair of horizontal sliding folding blades 64, 64' and mount them to slide transversely of the exit end of the die above the article, as shown by Fig. 13. Guideways 65, 65' are formed in the lower portion of the die to support said blades in their travel. For actuating said blades I have shown angle levers 66, 66' (see Fig. 3) pivoted at the rear end of the main frame on studs 67, 67'. The two arms of said angle levers are connected by a link 68, and one of said arms 66' is also connected by link 69 to operating lever 70 (see Fig. 4). Said lever 70 is operated by a slotted cam 71 mounted on the main shaft by means of the usual stud roller engagement. The free ends of said angle levers 66, 66' have studs 72, 72', respectively, which enter in chambers 73, 73' formed for them on the movable blades (see Figs. 3 and 13). The studs 72, 72' have a sufficiently loose play in the chambers 73, 73' so as not to interfere with the horizontal movement of said folding blades 64, 64'.

Operating at right angles to said folding blades 64, 64' is a third folding blade 74. A guiding block 75 mounted on the main frame supports the rear portion of the folding blade 74, and guideways are formed in the lower end of the die to support the forward portion thereof. Said folding blade 74 is actuated by an operating lever 76 pivotally mounted on shaft 9, and having a roller 77 to engage in the slot of the cam 78.

Figure 14:
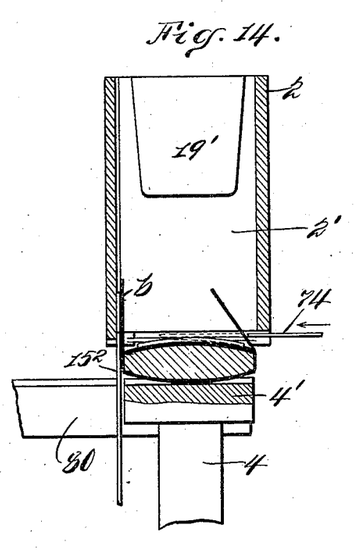
Figs. 14 and 15 are sections of the die taken at right angles to Fig. 13 and showing details of the side folding mechanism.

During the operation of the third folding blade 74 the guard $15^2$, previously described, as mounted on lower cross head 15, is carried upwardly by said cross head to stand against the opposite side of the article and wrapper to prevent displacement of the same during the action of said folding blade on the wrapper, illustrated clearly in Fig. 14.

Figure 15:
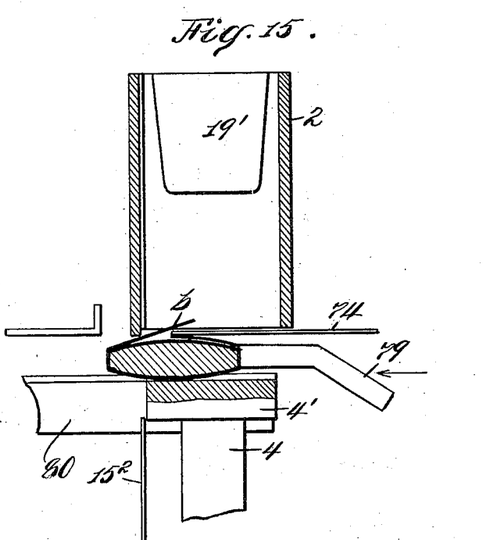

A delivery pusher 79 is mounted on the lower horizontal cross head 23 (see Figs. 4 and 15), and just at the completion of the action of said folding blade 74 the guard $15^2$ is withdrawn and the pusher 79 is carried by cross head 23 past the exit end of said die to deliver said article from the supporting head 4' to the delivery chute 80, as shown in Fig. 15. The action of the pusher 79 in delivering the article and wrapper past the exit end of the die causes the lower end wall of said die to fold down the remaining side flap of the wrapper, whereby the article is delivered into chute 80 completely wrapped. The paste previously applied to the wrapper causes said loose flap to stick and the cover 81 of chute 80 assists in maintaining said flap firmly down on top of the article.

Figure 19:
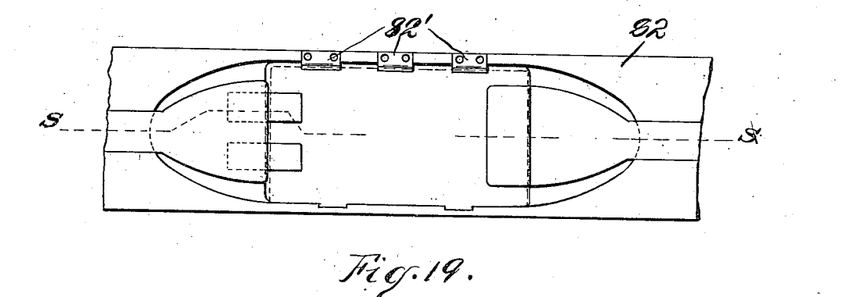
Fig. 19 is a plan view of a modified form of die.
Figure 20:
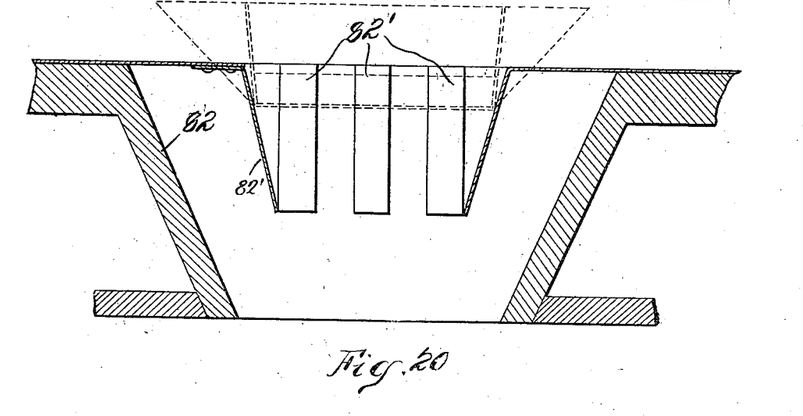
Fig. 20 is a vertical section therethrough taken on line S—S of Fig. 19.
Figure 21:
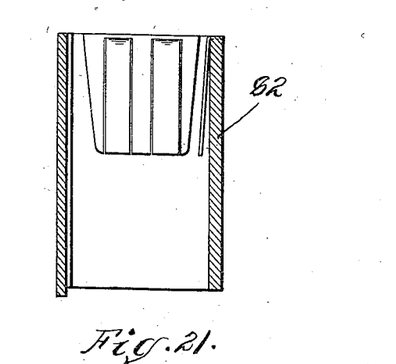
Fig. 21 is a vertical section of the same taken at right angles to Fig. 20.

In Figs. 19, 20 and 21 I have illustrated a modified form of my die 82 adapted for folding cakes having beveled edges, such as chocolate and the like. For the purpose of forming resiliently mounted and tapering side walls for said die, I have, in the present embodiment, attached thereon a number of thin flexible blades 82'. The upper ends of said blades are fixed to the mouth of the die, and the lower ends extend downwardly and slightly inwardly therefrom, and, being unsupported are free to yield. As will be understood from the dotted line illustration in Fig. 20, the flexible side walls 82' keep in close contact with the wrapper as the article is inserted and yield gradually to permit the passage of the wider portion of the same as it is forced through the die.

A brief summary of the operation of my machine is as follows: Assuming, first, that the carrier 31 is in its outmost position to receive an article from the magazine 34, the stepped portion 35 of the carrier then carries an article rearwardly to the mouth of the folding die, and also presents the paper grippers to the wrappers in receptacle 45. Jaws 52, 52' then grasp the article and support the same over the mouth of the die during the return movement of the carrier to obtain a second article. This return movement of the carrier for a new article also carries a wrapper seized by the paper grippers, as above described, and deposits the same over the mouth of the die beneath the article. Paste is here applied, as before described, to a portion of the wrapper, previous to the next operation. The forcing plunger 3 is then lowered to force the article and wrapper through the die while the supporting plunger 4 is simultaneously moved upwardly to meet the article, and then downwardly with the same through the die. At the exit end of the die the article rests upon the supporting plunger and the wrapper is left in an upstanding position with the corner folds lapped about the end of the article, as shown in top view in Fig. 12. The transversely moving folding blades 64, 64' then act upon the wrapper to fold down the end flaps, and immediately at the expiration of their operation the third folding blade 79 acts upon one side flap of the wrapper while the guard 15² prevents displacement. Lastly the guard is withdrawn and the pusher 79 delivers the article and wrapper past the lower end of the die, whereby the remaining side flap is folded down upon the wrapper.

I understand that many changes may be made in the construction shown in the drawings without departing from the spirit of my invention, and I therefore do not wish my claims to be limited to the particular embodiment here shown.

What I claim is:—

1. In a wrapping machine in combination, a main frame, a bottomless folding die mounted thereon, means for supplying the wrapper and article to the mouth of said die, a plunger for forcing said wrapper and article therethrough, said die being provided with means to fold the wrapper about the bottom and sides of said article, means adjacent the exit end of said die for forming the remaining folds of said wrapper down upon the top of said article comprising transversely operating folding blades, a movable guard plate for preventing displacement of said article during the operation of said folding blades, and a pusher for delivering the article from the lower end of said die.

2. In a wrapping machine in combination, a main frame, a bottomless folding die mounted thereon, a feeding carrier for supplying an article and paper grippers mounted on said carrier for supplying a wrapper to the mouth of said die, means for forcing said wrapper and article therethrough, said die being provided with means to fold the wrapper over the bottom with upstanding portions around all the sides of said article, and means adjacent the exit end of said die for folding said upstanding portions in successive flaps down upon the same side of the article.

3. In a wrapping machine in combination, a main frame, a bottomless folding die mounted thereon, a feeding carrier for supplying an article, and paper grippers mounted on said carrier for supplying a wrapper to the mouth of said die, means for forcing said wrapper and article therethrough, said die being provided with means to fold the wrapper over the bottom with upstanding portions around all the sides of said article, and means adjacent the exit end of said die for forming the remaining folds of the wrapper down upon the top of said article comprising transversely operating folding blades.

4. In a wrapping machine in combination, a main frame, a bottomless folding die mounted thereon, a feeding carrier for supplying an article to the mouth of said die, means for supporting said article above said die, paper grippers mounted on said carrier for supplying a wrapper to said die, means for forcing said wrapper and article therethrough, said die being provided with means to fold the wrapper over the bottom with upstanding portions around all the sides of said article, and means traveling across the exit end of said die for folding said upstanding portions in successive flaps down upon the same side of the article.

5. In a wrapping machine in combination, a main frame, a bottomless folding die mounted thereon, a feeding carrier for supplying an article to the mouth of said die, a pair of jaws pivotally mounted on said main frame adapted to receive said article and support the same above said die, a cam-controlled lever mounted on said main frame, and connections between said lever and supporting jaws to operate the same simultaneously to seize said article, paper grippers mounted on said carrier for carrying a wrapper to said die beneath said suspended article, means for forcing said wrapper and article therethrough.

6. In a wrapping machine in combination, a main frame, a bottomless folding die mounted thereon, a feeding carrier for supplying an article to the mouth of said die, a pair of pivotally mounted jaws adapted to receive said article and support the same above said die, paper grippers mounted on said carrier for supplying a wrapper to said die, means for forcing said wrapper and article therethrough, said die being provided with means to fold the wrapper over the bottom with upstanding portions around all the sides of said article, transversely operating folding blades adjacent the exit end of said die to act upon the wrapper, and a pusher for delivering said article transversely from said die whereby said wrapper is completely folded down upon said article.

7. In a wrapping machine in combination, a main frame, a bottomless folding die mounted thereon, a plunger for forcing a wrapper and article therethrough, said die being provided with means to fold the wrapper about the bottom and around all the sides of said article, a supporting plunger, and operating means for causing the same to coöperate with said forcing plunger to support the article and wrapper in the passage through the die and maintain said article at the exit end of said die with the upstanding portions of the wrapper extending therein, horizontally and transversely operating folding blades acting on the upstanding portions of said wrapper to fold the same down upon the top of the article, guideways for said folding blades formed in the lower portion of said die.

8. In a wrapping machine in combination, a main frame, a bottomless folding die mounted thereon, a plunger for forcing a wrapper and article therethrough, said die being provided with means to fold the wrapper about the bottom and around all the sides of said article, a supporting plunger, and operating means for causing the same to coöperate with said forcing plunger to support the article and wrapper in the passage through the die and maintain said article at the exit end of said die with the upstanding portions of the wrapper extending therein, transversely operating folding blades acting on the upstanding portions of said wrapper to fold the same down upon the top of the article, guideways for said folding blades formed in the lower portion of said die, and a pusher for delivering said article transversely from the exit end of said die whereby the same acts upon the wrapper to fold it down upon the top of the article.

9. In a wrapping machine in combination, a main frame, a bottomless folding die mounted thereon, a plunger for forcing a wrapper and article therethrough, said die being provided with means to fold the wrapper about the bottom and sides of said article, a supporting plunger and operating means therefor to cause the same to coöperate with said forcing plunger to support the article and wrapper in a passage through the die and maintain said article at the exit end of said die with the upstanding portions of the wrapper extending therein, a pair of oppositely movable folding blades located adjacent the exit end of said die, means for operating said folding blades simultaneously to act on said wrapper to fold the end flaps of the same down upon the top of the article, a third folding blade located adjacent the exit end of said die, and means for operating the same to fold a side flap of the wrapper down upon the top of the article.

10. In a wrapping machine in combination, a main frame, a bottomless folding die mounted thereon, a plunger for forcing a wrapper and article therethrough, said die being provided with means to fold the wrapper about the bottom and sides of said article, a supporting plunger and operating means for causing the same to coöperate with said forcing plunger to support the article and wrapper in their passage through the die and maintain said article at the exit end of said die with the upstanding portions of the wrapper extending therein, a pair of oppositely movable folding blades located adjacent the exit end of said die, means for operating said folding blades simultaneously to act on said wrapper to fold the end flaps of the same down upon the top of the article, a third folding blade located adjacent the exit end of said die, and means for operating the same to fold a side flap of the wrapper down upon the top of the article, a pusher for delivering said article transversely from the exit end of said die whereby the lower edge of said die acts upon a side flap of the wrapper to fold the same down upon the top of the article.

11. In a wrapping machine in combination, a main frame, a bottomless folding die mounted thereon, a plunger for forcing the wrapper and article therethrough, said die being provided with means to fold the wrapper about the bottom and sides of said article, a supporting plunger, and operating means for causing the same to coöperate with said forcing plunger to support the article and wrapper in their passage through the die with the upstanding portions of the wrapper extending therein, a pair of oppositely movable folding blades located adjacent the exit end of said die, means operating said folding blades to simultaneously act upon said wrapper to fold the end flaps of the same down upon the top of the article, comprising a pair of levers connected together at one end and having their free ends connected to said folding blades, cam-controlled means connected to said pair of levers for operating the same, a third folding blade mounted adjacent the exit end of said die, and cam-controlled means for operating the same to fold a side flap of the wrapper down upon the top of the article, a pusher for delivering said article transversely from the exit end of said die whereby the lower edge of said die acts upon a side flap of the wrapper to fold the same down upon the top of the article.

12. In a wrapping machine in combination, a bottomless folding die, means for supplying a wrapper and article to the mouth of said die, a reciprocating plunger for forcing said article and wrapper through said die, means for supporting said article at the exit end thereof, a pair of oppositely slidable folding blades, means for operating said folding blades simultaneously across the exit end of said die to act on said wrapper for folding the same comprising a pair of levers connected together at one end and having their free ends connected to said folding blades, and cam-controlled means connected to said pair of levers for operating the same.

13. In a wrapping machine in combination, a folding die, a reciprocating carrier for feeding articles to the mouth of said die, a pair of pivotally mounted jaws for temporarily supporting an article above said die, positive actuating means for operating said jaws to grasp and release said article at proper times, means for feeding a wrapper beneath said jaws and depositing the same upon said die, and a plunger for forcing said article and wrapper therein.

14. In a wrapping machine in combination, a main frame, a folding die mounted thereon, a pair of jaws pivotally mounted on said main frame for supporting an article above said die, a cam controlled lever mounted on said main frame and connections between said lever and the supporting jaws to operate the same simultaneously.

15. In a wrapping machine in combination, a main frame, a folding die mounted thereon, a pair of jaws pivotally mounted on said main frame for supporting an article above said die, a cam-controlled lever mounted on said main frame, and connections between said lever and the supporting jaws to operate the same simultaneously, a reciprocating carrier for supplying an article to said jaws, paper grippers mounted to travel beneath said jaws for depositing a wrapper upon said die, a plunger for forcing said article and wrapper into said folding die.

16. In a wrapping machine in combination, a folding die, a bottomless magazine containing articles to be wrapped, a reciprocating carrying table mounted to slide transversely of the lower end of said magazine, a portion of said carrying table being stepped to permit an article to be dropped therein when said stepped portion is moved past the lower end of said magazine, operating means for said carrying table to cause the same to deposit an article over the mouth of said die, pivoted jaws and operating means to cause the same to grip and support said article above the mouth of said die, means for supplying a wrapper to said die and a plunger for forcing said article and wrapper into said folding die.

17. In a wrapping machine in combination, a folding die, a bottomless magazine containing articles to be wrapped, a supply of wrappers located adjacent said folding die, a reciprocating carrying table mounted to slide transversely of the lower end of said magazine, a portion of said carrying table being stepped to permit an article to drop therein when said stepped portion is moved past the lower end of said magazine, paper grippers mounted on said carrying table, operating means for said carrying table to cause the same to deposit an article over the mouth of said die and to bring said paper grippers adjacent to said wrapper supply, pivoted jaws, and operating means to cause the same to grip and support said article above the mouth of said die and means for operating said grippers to seize a wrapper, said carrying table operating means also causing the same to feed a wrapper over the mouth of said die, and a plunger for forcing said article and wrapper into said folding die.

18. In a wrapping machine in combination, a bottomless folding die, said die having resiliently mounted side walls normally tapering inwardly from the mouth, means for supplying a wrapper and article to the mouth of said die, power devices acting on said article adapted to force the same simultaneously with said wrapper through said die, said die being provided with means to fold the wrapper over the bottom with upstanding portions around all the sides of said article as the same is forced therethrough, and folding means traveling across the exit end of said die for performing the remaining folding operations to completely wrap the article.

19. In a wrapping machine in combination, a bottomless folding die substantially rectangular in shape and having a rectangular passageway therethrough, said die having slots extending outwardly from the four corners of the rectangular mouth of said die, the lower ends of said slots communicating with the main rectangular passageway, the side walls of said die being resiliently mounted and normally tapering inwardly toward the exit end thereof, means for supplying a wrapper and article to the mouth of said die, and a plunger for forcing said article and wrapper therethrough.

20. In a wrapping machine in combination, a folding die having four side walls, slots extending outwardly from the four corners of said die, means to force an article and wrapper therein whereby said wrapper is folded into upstanding portions against the sides of the article with outwardly cocked corners extending in said slots, said die being provided with means to fold said outwardly cocked corners against the ends of the article, means to fold the two end portions of said wrapper in flaps down upon one side of the article, and means to fold the remaining side portions in successive flaps down upon the same side and above said first flaps.

21. In a wrapping machine in combination, a rectangular folding die, means for supplying a wrapper and article to the mouth of said die, a vertically reciprocating plunger for forcing the wrapper and article therein, whereby the wrapper is folded into upstanding portions against the four sides of said article, means to fold the two end portions of said wrapper in flaps down upon one side of the article, and means to fold the remaining side portions of said wrapper in successive flaps down upon the same side of said article and above said first flaps.

22. In a wrapping machine in combination, a rectangular folding die, means for supplying a wrapper and article to the mouth of said die, a vertically reciprocating plunger for forcing the wrapper and article therein, whereby the wrapper is folded into upstanding portions against the four sides of said article, means for folding two end portions and one side portion in flaps down upon one side of the article, and means for delivering said article transversely from said die whereby the remaining portion is folded down upon the same side of the article and above said first named flaps.

23. In a wrapping machine in combination, a rectangular folding die, means for supplying a wrapper and article to the mouth of said die, an upper vertically reciprocating plunger for forcing a wrapper and article therein, and a lower independently reciprocated plunger coöperating therewith for supporting said article in its passage through said die, whereby the wrapper is folded into upstanding portions against the four sides of said article, transversely operated folding blades for folding the two end portions and one side portion in flaps down upon the same side of the article, and means for delivering said article transversely from said die, whereby the remaining portion is folded down upon the same side of the article and above said first-named flaps.

24. In a wrapping machine in combination, a main frame, a folding die-chute thereon, upper and lower reciprocating cross-heads on said main frame for approaching and receding from the upper and lower ends of said die-chute respectively, said upper cross-head provided with means to feed an article and wrapper to the mouth of said die-chute, means for forcing the article and wrapper through said chute for forming the folds of a wrapper around said article, said lower cross-head provided with means for delivering said finished package from the tail of said chute.

25. In a wrapping machine in combination, a main frame, a folding die-chute thereon, upper and lower reciprocating cross-heads on said main frame, a single rocking shaft therefor having connections to operate said cross heads simultaneously in opposite directions for approaching and receding from the upper and lower ends of said die-chute respectively, said upper cross-head provided with means to feed an article and wrapper to the mouth of said die-chute, means for forcing the article and wrapper through said chute for forming the folds of a wrapper around said article, said lower cross-head provided with means for delivering said finished package from the tail of said chute.

26. In a wrapping machine in combination, a folding chute with open ends and having a substantially rectangular mouth, said chute having formed at the corners thereof spirally-arranged slots, means for carrying a wrapper and article between upper and lower supports through said chute whereby corner portions of said article are carried by said spiral slots first into outwardly cocked corners and finally against the sides of said article, means for making all the remaining folds but one of said wrapper down upon the same side of the article before said article changes its direction of movement, and means for ejecting said article in a different direction to thereby obtain the last fold of said wrapper down upon said article.

27. In a wrapping machine in combination, a rectangular folding die chute with four side walls, means for presenting an article and a wrapper in front thereof at the entrance to said die chute, means for engaging said article and pushing the same with the wrapper before it into said die chute, said die chute provided with means to outwardly cock the corners of said wrapper and then fold said wrapper in vertical portions against the four sides of said article, and means for folding all of said vertical wrapper portions inwardly from the side walls of said die chute in flaps against the uncovered side of said article before said wrapper and article is wholly discharged from said die chute.

28. In a wrapping machine in combination, a rectangular folding die chute with four side walls, means for presenting an article and a wrapper in front thereof at the entrance to said die chute, means for engaging said article and pushing the same with the wrapper before it into said die chute, said die chute provided with means to outwardly cock the corners of said wrapper and then fold said wrapper in vertical portions against the four sides of said article, and folding devices movable transversely of said die chute for folding all of said vertical wrapper portions inwardly from the side walls of said die chute in flaps against the uncovered side of said article.

29. In a wrapping machine, in combination, a rectangular folding die chute with four side walls, means for presenting an article and a wrapper in front thereof at the entrance to said die chute, means for engaging said article and pushing the same with the wrapper before it into said die chute, said die chute provided with means to outwardly cock the corners of said wrapper and then fold said wrapper in vertical portions against the four sides of said article, movable folding devices for folding three of said vertical wrapper portions inwardly from the side walls of said die chute in flaps against the uncovered side of said article, and means for ejecting said article past the edge of a wall of said die chute to fold the remaining portion of the wrapper against said article outside of said first flaps.

30. In a wrapping machine in combination, a rectangular folding die chute with four side walls, means for presenting an article and a wrapper in front thereof at the entrance to said die chute, means for engaging said article and pushing the same with the wrapper before it into said die chute, said die chute provided with means to outwardly cock the corners of said wrapper and then fold said wrapper in vertical portions against the four sides of said article, and means in close proximity to the exit end of said die for folding all of said vertical wrapper portions while still extending within said die chute inwardly from the side walls of said die chute in flaps against the uncovered side of said article.

31. In a wrapping machine in combination, a rectangular folding die chute with four side walls and open at each end, means for presenting an article and a wrapper in front thereof at the entrance to said die chute, a plunger for engaging said article and pushing the same with a wrapper before it through said die chute, a supporting table for engaging said article at the opposite side from said plunger to coöperate therewith in carrying the article through said die chute, said die chute provided with means to outwardly cock the corners of said wrapper and then fold said wrapper in vertical portions against the four sides of said article, and means for folding all of said vertical wrapper portions inwardly from the side walls of said die chute in flaps against the uncovered side of said article.

Signed at New York, N. Y., this 25th day of February 1908.

GEORGE R. WARD.

Witnesses:
EMERSON R. JEWELL,
BEATRICE MIRVIS.

Copies of this patent may be obtained for five cents each, by addressing the "Commissioner of Patents, Washington, D. C."